R. BÖMCKE.
METALLIC STUFFING BOX PACKING.
APPLICATION FILED MAR. 30, 1908.
909,983.  Patented Jan. 19, 1909.
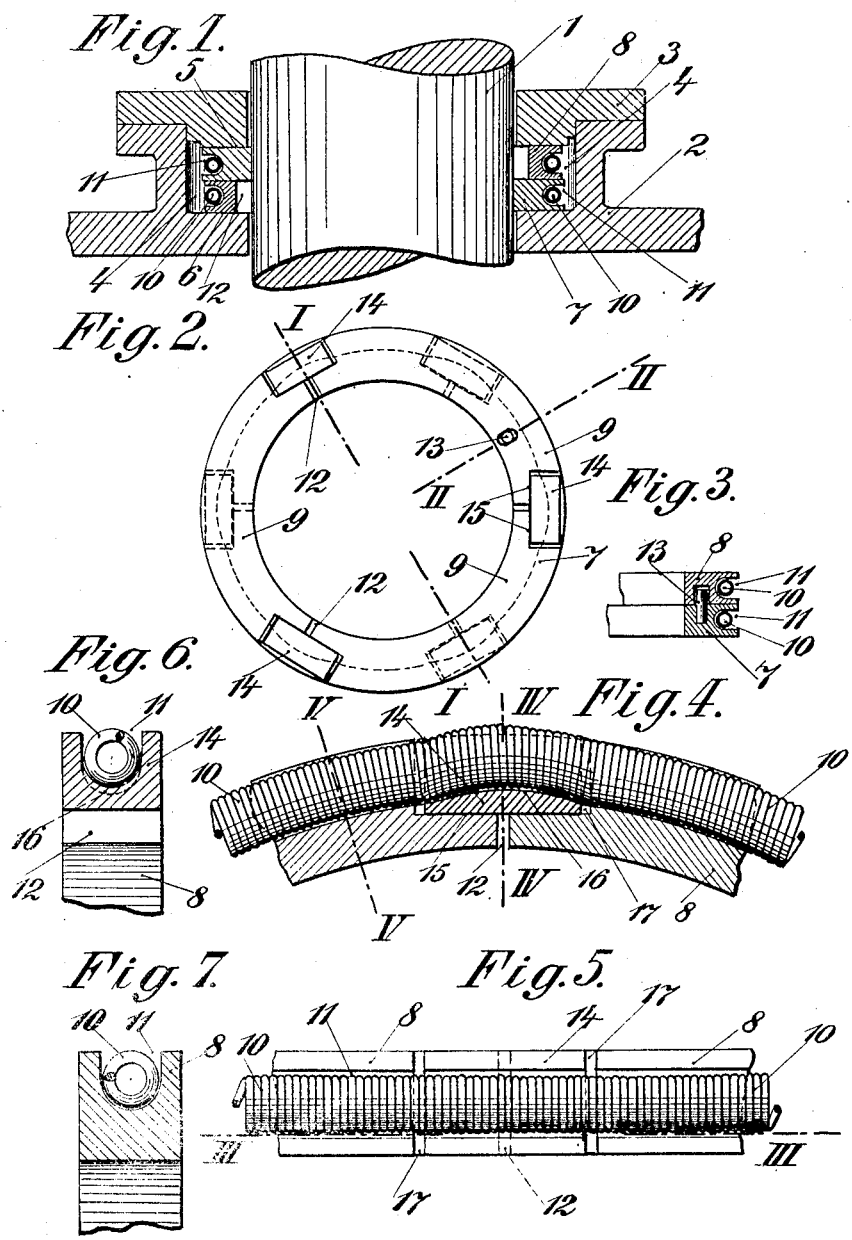
Witnesses:  Inventor:

UNITED STATES PATENT OFFICE.

REINOLD BÖMCKE, OF DORTMUND, GERMANY.

METALLIC STUFFING-BOX PACKING.

No. 909,983.  Specification of Letters Patent.  Patented Jan. 19, 1909.

Application filed March 30, 1908. Serial No. 424,103.

*To all whom it may concern:*

Be it known that I, REINOLD BÖMCKE, a subject of the German Emperor, and resident of 71 Arndtstrasse, Dortmund, Germany, have invented certain new and useful Improvements in Metallic Stuffing-Box Packing, of which the following is a specification.

My invention relates to a stuffing box packing consisting of two or more metal rings placed behind one another; each metal-ring consists of several parts in the form of segments, which are held together by a spiral spring running around the circumference, and between which, side joints of sufficient width are placed radially, in order to allow the adjustment of the segments according to the tightening required; these side joints are closed by small plates lying on the periphery.

The features of the invention are in the first place that the metal plates are held and pressed against the ends of the segments by means of the even spiral spring, which also holds the segments together; secondly, the arrangement of a heightening placed eccentrically in the bottom of the slot in the metal plates, in order to insure the pressing of the metal plates on the ends of the segments of the metallic packing rings.

The accompanying drawings illustrate the invention as follows:—

Figure 1 is a horizontal section through the stuffing box case and the new packing (line I—I of Fig. 2) with a part view of a piston rod, or similar object requiring packing. Fig. 2 is a view of the packing from the front. Fig. 3 is part of a section through the packing, in accordance with line II—II of Fig. 2. Fig. 4 is part of a vertical section through one ring of the packing taken on line III—III of Fig. 5 and showing the side joint placed between two segments, and the metal plate covering this joint, and also the spiral spring running round the circumference. Fig. 5 is a plan according to Fig. 4. Fig. 6 is a section according to line IV—IV of Fig. 4. Fig. 7 is a section according to line V—V of Fig. 4.

1 is the moving rod which requires packing, 2 is the packing casing and 3 is the cover of the packing casing. The hollow space 4 of the packing casing is provided with even front faces 5 and 6, the distance between which is unalterable. In the hollow space 4 are two or more packing rings of metal 7 and 8, lying radially free to move, which are so made that they are tight against one another as well as against the faces 5 and 6. Each of these rings consists of several segment parts 9, in the example shown in the drawing three such parts are provided.

The parts 9 are held together in the well known manner by means of a spiral spring 10 running round the circumference, and are permanently pressed against the rod 1.

The spiral spring 10 can be advantageously placed in a groove 11 made in the periphery of the parts 9 in the direction of the circumference.

Between the parts 9 the side joints 12 are placed radially, which are sufficiently wide to allow the subsequent adjustment of the parts 9 against the rod 1 in conformity to the wear.

The joints of the one ring 7 are changed against those of the other ring 8 (Fig. 2). By means of a pin 13 (Figs. 2 and 3) which engages with both rings 7 and 8, the alternation of the position of the rings 7 and 8 to one another in the sense of direction of the circumference is prevented, so that the joints 12 of the one ring are permanently kept at a distance from the joints 12 of the other ring. Several pins 13 can of course be arranged.

In order to avoid the escape of the pressure medium (steam, gas, water etc.), the joints 12 are covered by metal plates 14. It is advantageous to provide recesses 15 in which the plates 14 can lie.

The plates 14, similarly to the parts 9 have a peripheral groove 11 in which the spiral spring 10 lies. The holding and pressing of the metal plates 14 against the ends of the parts 9 is accomplished by means of the spiral spring 10. At the bottom of the groove for the spiral spring 10 on the outer side of the metal plates an eccentric heightening 16 is provided, in order to insure the pressing on of the plates 14. Joints 17 between the end surfaces of the metal plates 14 and the end surfaces of the parts 9 lying opposite to them, allow the adjustment of the plates, when, due to wear, the parts 9 alter their position, and in this case prevent the jamming of the parts 9.

What I claim as my invention and desire to secure by Letters Patent is:—

1. In a metallic packing the combination of a number of metal rings consisting of several parts, radial joints between the separate parts of said metal rings, metal plates to cover the said joints, a groove running round the outer surface of the said metal ring parts and metal plates, an annular spiral spring in the said groove and adapted for pressing the said metal ring parts against the rod to be packed and the said metal plates against the ends of the said metal ring parts, and an eccentric heightening at the bottom of the groove of the said metal plates and adapted to force the said spiral spring outward and to cause the latter to press more strongly on said metal plates than on the said metal ring parts, substantially as set forth.

2. In a metallic packing the combination of a number of metal rings consisting of several parts, radial joints between the separate parts of said metal rings, recesses at the butting ends of said metal ring parts, metal plates inserted in the said recesses and adapted to cover the said joints, the said recesses adapted to prevent lateral movement of the said metal plates, a groove running round the outer surface of the said metal ring parts and metal plates, an annular spiral spring in the said groove and adapted for pressing the said metal ring parts against the rod to be packed and the said metal plates against the ends of the said metal ring parts, and an eccentric heightening at the bottom of the groove of the said metal plates and adapted to force the said spiral spring outward and to cause the latter to press more strongly on said metal plates than on the said metal ring parts, substantially as set forth.

3. In a metallic packing the combination of a number of metal rings consisting of several parts, radial joints between the separate parts of said metal rings, the said joints of one metal ring lying in juxta-position towards the joints of the next metal ring, means for preventing the movement of one of the said rings against the other, recesses at the butting ends of the said metal ring parts and having straight inner surfaces, metal plates inserted in the said recesses and adapted to cover the said joints, the said recesses adapted to prevent lateral movement of the said metal plates, a groove running round the outer surface of the said metal ring parts and metal plates, an annular spiral spring in the said groove and adapted for pressing the said metal ring parts against the rod to be packed and the said metal plates against the ends of the said metal ring parts, and an eccentric heightening at the bottom of the groove of the said metal plates and adapted to force the said spiral outward and to cause the latter to press more strongly on said metal plates than on the said metal ring parts, substantially as set forth.

In testimony whereof I have hereunto signed my name this 19th day of March 1908, in the presence of two subscribing witnesses.

REINOLD BÖMCKE.

Witnesses:
PETER LIEBER,
WILHELM FLASCHE.